Aug. 28, 1934.  R. H. SUTTERLIN  1,971,628
STRADDLE DIAL MICROMETER
Filed April 14, 1931
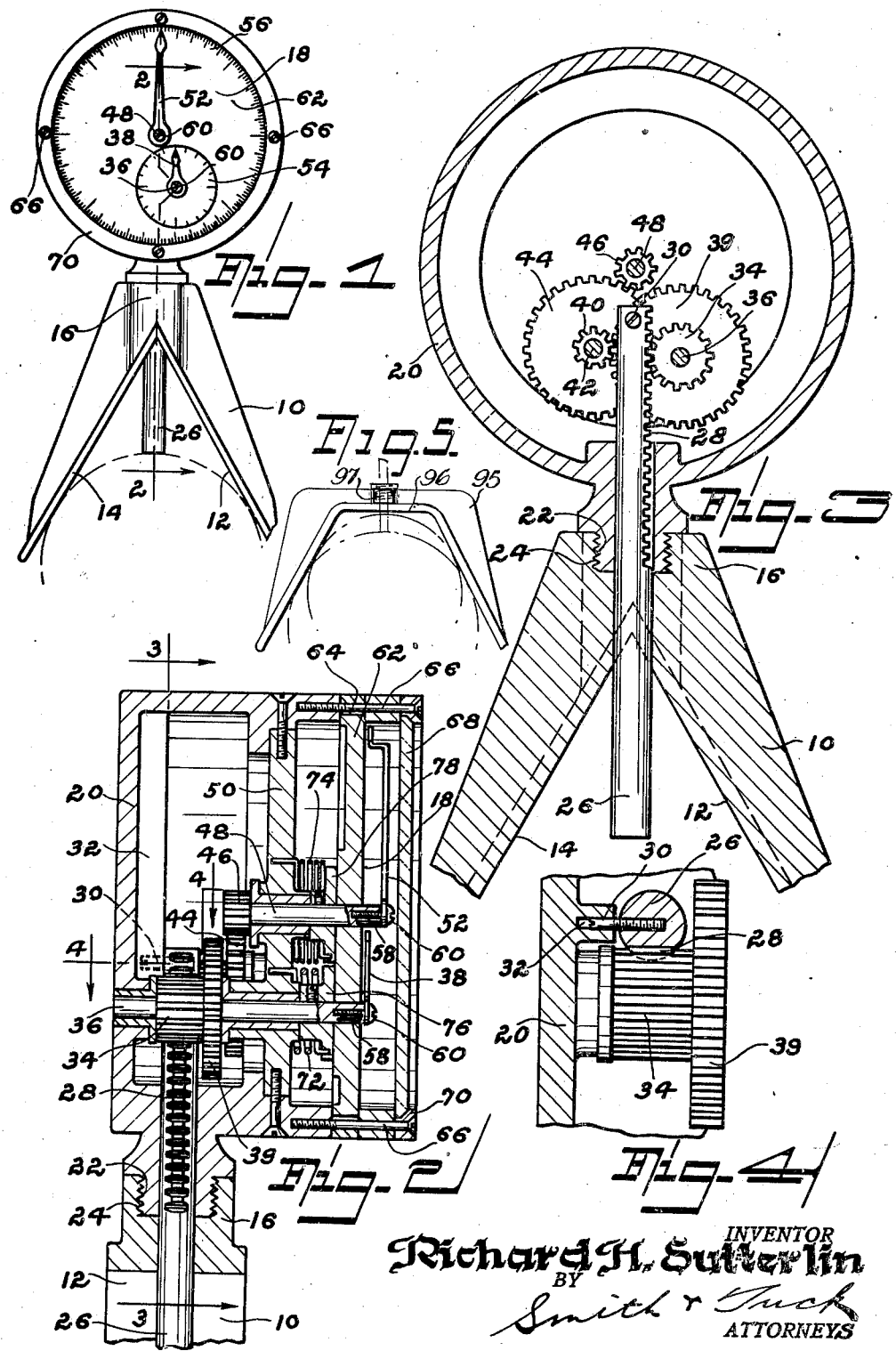

Patented Aug. 28, 1934

1,971,628

UNITED STATES PATENT OFFICE 1,971,628

STRADDLE DIAL MICROMETER

Richard H. Sutterlin, Seattle, Wash.

Application April 14, 1931, Serial No. 530,003

1 Claim. (Cl. 33—178)

My present invention relates to the art of measuring devices and more particularly to a straddle dial micrometer which is adapted to measure the diameter of a cylinder. Many devices have been produced for measuring with varying degrees of accuracy the thickness or the distance between two points. The ones formerly used, however, have all been based upon the principle of measuring the distance between two contacted points. In my present device I provide a V-shaped engaging means which will accurately measure the diameter of a circle and yet will not engage the cylinder at a diameter. Gauges of this character permit of very quick readings and when made as precision tools, give direct readings that are very accurate. It is also possible to determine the radius on which a segment is machined without having the full circle. Considerable time is lost by a machinist every time he attempts to caliper a piece of material which he has in a lathe. This is because, in order to get an accurate reading, he must make absolutely certain that his cylinder has stopped rotating before he applies his caliper, considering, of course, a micrometer caliper. These calipers are normally adapted to engage the cylinder between two flat surfaces and if the cylinder is revolving even so slightly there is serious danger that the caliper will become wedged on the cylinder and possibly be carried around a part of a revolution. This is a quite common source of accident wherein injuries occur to the machinist and oftentimes the accuracy of the caliper is forever ruined. The machinist further loses time because of the necessity for applying the caliper, normally used, at the exact center, or on an exact diameter more properly, of the cylinder. It is to overcome this condition that I have provided my caliper; therefore, The principal object of my invention is to provide a caliper which will engage a cylindrical surface and give the diameter of said cylinder without the necessity of engaging it at its diameter.

A further object is to provide means whereby a single dial device may be quickly changed to any one of a number of V-shaped frames and thus permit the reading of a wide range of diameters with a single dial mechanism.

Other and more specific objects will be apparent from the following description taken in connection with the accompanying drawing, wherein Figure 1 is a face view of my caliper showing the face of a precision type.

Figure 2 is a sectional view along the line 2—2 of Figure 1.

Figure 3 is a sectional view along the line 3—3 of Figure 2.

Figure 4 is a fragmentary sectional view taken along the line 4—4 of Figure 2.

Figure 5 is a view showing a modified form of my V-shaped means in which the upper end of the V has been removed so as to make it possible to use a single dial unit.

Referring to the drawing throughout which like reference characters indicate like parts, numeral 10 designates the V-shaped cylinder engaging member. I have chosen for sake of simplicity the included angle of the V to be 60°. This enables me to make use of the geometrical relationship in which the 60° angle intercepts a chord of a circle equal to the radius. It will be apparent I believe that other angles might be used and appropriate gearing arranged to take care of the changing relationship. However, the use of the 60° angle has proven highly satisfactory. The V is provided with accurately machined cylinder engaging surfaces 12 and 14 which should have some appreciable width so that the caliper will be quickly brought into normal relationship with the cylinder.

Engaging boss 16 at the apex of the V is the indicated dial arrangement 18. This consists of a housing 20 having at its lowermost end a threaded portion 22 which is adapted to engage a complementary threaded portion 24 in the V member. Disposed for reciprocal movement on the median of the V is a plunger member 26. This is adapted to be guided in a carefully ground guideway in both members 10 and 20. To insure the accuracy required I prefer that plunger 26 be cylindrical excepting at its uppermost end where the cylinder is interrupted over approximately one-fourth of its surface by having the rack gear teeth 28 cut therein. I further provide a guide pin 30 which is secured in plunger 26, preferably near its upper end and adapted to engage the guideway 32 formed in housing 20. This prevents any rotation of plunger 26 and further to the general stiffness of the same. Adapted to engage rack 28 is a pinion gear 34. Gear 34 is fixedly secured to shaft 36 which in turn is suitably journaled within housing 20.

As a matter of convenience I have so proportioned gear 34 that one complete revolution of the same will cover the entire possible travel of plunger 26. If, for instance, the entire movement of plunger 26 were to be one inch, then the pitch circumference of gear 34 should likewise be one inch. This relationship makes it possible to secure indicating hand 38 directly to shaft 36. Now, it must be understood that in measuring a diameter, plunger 26 accordingly measures only the radius; consequently if it moves 1″ it would indicate a diameter difference of two inches. The first whole number of this difference and the tens digit will be indicated by hand 38.

Secured also to shaft 36 is a large gear 39. This meshes with a small pinion 40 secured to shaft 42, which shaft is suitably journaled in housing 20. Secured also to shaft 42 is the large gear 44 which in turn meshes with the small pinion 46 which is secured to shaft 48 and which in turn is suitably journaled in disc 50 which is fixedly secured to housing 20. Now the gears of the sizes indicated in Figure 3 will produce a 10 to 1 speed increase between shaft 36 and shaft 48. Consequently hand 52 which is secured to shaft 48 will make 10 complete turns while hand 38 is making one. It is then possible to read the hundreds and thousands digits of the diameter change. With the two hands as indicated and suitable graduations on their respective dials 54 and 56 the complete diameter change can be read, giving the full number of units and the fractional amount to three places.

Hands 38 and 52 may be secured to their respective shafts by any of the well known means. I have illustrated a locking dowell 58 which is adapted to pass through the hand into the shaft and thus prevent movement of the hand relative to the shaft, and I then provide screws as 60 to hold the hand in tight engagement with the shaft and also to prevent the dowell working out. In the illustrations I have shown dials 54 and 56 as formed on a single plate member 62. Now, I have found it very desirable to employ slotted holes at 64 so that as wear occurs in the device adjustment may be made by revolving plate 62 slightly and then tightening the securing screws 66. I have further found it desirable in a precise instrument of this type to use a transparent crystal 68; this is adapted to be secured in place by the bezel 70 which in turn is secured to member 20 by means of a plurality of screws 66.

Now, it is well known that in any mechanism employing gearing a certain amount of back lash is sure to occur and this may change from time to time as wear progresses. Now, if the back lash is always taken up in the same direction the readings will be accurate. To this end then I have provided the torsion springs 72 and 74. Spring 72 need only take care of one turn. Consequently it can be made rather heavy. One end is turned to engage the fixed plate 50. The other end is turned to engage flange member 76 which is fixedly secured to shaft 36. This arrangement constantly forces pinion 34 into engagement with plunger 26 in a manner to urge it outwardly. This serves the dual purpose then of always maintaining the plunger in its outermost position and further takes up all slack between gear 34 and rack 28.

Disposed about shaft 48 is a lighter coil spring 74 but which is similarly disposed. It has been necessary, however, to make this spring lighter, make the turns of larger diameter, and to increase the number of turns so that it is capable of being connected to shaft 48 through means of the flange 78 secured to shaft 48, while the shaft makes ten complete revolutions. This spring anchored as it is similar to spring 72 takes up all slack in the gears from gear 46 through gear 44, 40, down to gear 39. In this way through the use of the two springs all the slack is taken up, in the same sense, and accurate readings assured.

In the form shown in Figure 5 I have illustrated a V-shaped cylinder engaging member 95 which to save unnecessary material and to further permit the use of a single dial unit on large diameters, has been flattened at 96. Boss 97 is adapted to receive the threaded portion 22 of housing 20 of the form illustrated in Figures 1, 2 and 3, it being the intent to have a wide range of sizes of members 95 and to use the same dial mechanism as an interchangeable unit with these various members and to thus cover a wide range of diameters.

The foregoing description and the accompanying drawing are believed to clearly disclose a preferred embodiment of my invention but it will be understood that this disclosure is merely illustrative and that such changes in the invention may be made as are fairly within the scope and spirit of the following claim:

I claim:

A gage for cylindrical surfaces comprising a housing having a threaded boss, a pair of integral diverging jaws having a socket to receive the boss, and said housing having an interior guide groove, a reciprocable plunger mounted in the housing and projecting along the line bisecting the angle between the jaws, a laterally extending guide pin on the plunger movable in said groove, a rack on the plunger, a shaft mounted in the housing and a pinion on the shaft engaging the rack, an indicator on said shaft exterior of the housing, a large gear on said shaft, a second pinion engaging said large gear and a shaft for the second pinion, a second large gear on the second shaft, a central shaft and a pinion thereon engaging the second large gear, and an indicator on the central shaft exterior of the housing.

RICHARD H. SUTTERLIN.